US010356342B2

(12) United States Patent
Greiffenberg et al.

(10) Patent No.: US 10,356,342 B2
(45) Date of Patent: Jul. 16, 2019

(54) METHOD FOR EXTENDING THE DYNAMIC RANGE OF A PIXEL DETECTOR SYSTEM USING AUTOMATIC GAIN SWITCHING

(71) Applicant: PAUL SCHERRER INSTITUT, Villigen PSI (CH)

(72) Inventors: Dominic Greiffenberg, Zurich (CH); Aldo Mozzanica, Windisch (CH); Xintian Shi, Hauterive (CH); Bernd Schmitt, Lauchringen (DE)

(73) Assignee: Paul Scherrer Institut, Villigen PSI (CH)

( * ) Notice: Subject to any disclaimer, the term of this patent is extended or adjusted under 35 U.S.C. 154(b) by 0 days.

(21) Appl. No.: 15/764,928

(22) PCT Filed: Jul. 15, 2016

(86) PCT No.: PCT/EP2016/066931

§ 371 (c)(1),
(2) Date: Mar. 30, 2018

(87) PCT Pub. No.: WO2017/054952

PCT Pub. Date: Apr. 6, 2017

(65) Prior Publication Data

US 2018/0288338 A1 Oct. 4, 2018

(30) Foreign Application Priority Data

Oct. 1, 2015 (EP) .................................... 15187992

(51) Int. Cl.

| | |
|---|---|
| ***H04N 5/32*** | (2006.01) |
| ***H04N 5/378*** | (2011.01) |
| ***H04N 5/235*** | (2006.01) |
| ***H04N 5/243*** | (2006.01) |
| ***G01T 1/29*** | (2006.01) |

(52) U.S. Cl.
CPC ............ *H04N 5/32* (2013.01); *G01T 1/2928* (2013.01); *H04N 5/2355* (2013.01); *H04N 5/243* (2013.01); *H04N 5/378* (2013.01)

(58) Field of Classification Search
CPC ....... H04N 5/32; H04N 5/2355; G01T 1/2928
See application file for complete search history.

(56) References Cited

U.S. PATENT DOCUMENTS 6,324,244 B1 11/2001 Lauter et al.
6,486,808 B1 11/2002 Seppi et al.
(Continued)

FOREIGN PATENT DOCUMENTS

DE 102005020503 A1 11/2006
GB 2237465 A 5/1991

OTHER PUBLICATIONS

Roger Steadman, Francisco Morales Serrano, Gereon Vogtmeier, Armin Kemna, Erol Oezkan, Werner Brockherde; (A CMOS Photodiode Array With In-Pixel Data Acquisition System for Computed Tomography, IEEE Journal of Solid-State Circuits, vol. 39, No. 7, Jul. 2004; p. 1034-1043).*

(Continued)

*Primary Examiner* — Hugh Maupin
(74) *Attorney, Agent, or Firm* — Laurence Greenberg; Werner Stemer; Ralph Locher

(57) ABSTRACT

An X ray detector with single photon measurement capabilities includes a layer of photosensitive material and an N×M array of photo-detector diodes in the layer of photosensitive material. The photo-detector diodes have a bias potential interface and a diode output interface. An N×M array of high gain, low noise readout unit cells are assigned to the photo-detector diodes. Each readout unit cell has an input interface connecting the diode output interface to a high-gain charge-to-voltage amplifier with integration capacitors. The high-gain charge-to-voltage amplifier can (Continued)

switch between different gains. A comparator and a digital block monitors the charge of the integration capacitance and switches the gain depending from the monitored charge of the integration capacitance. The pixel detector provides the possibility of in pixel intermediate evaluation of an automatic gain switching circuit state to increase the dynamic range of the detector in case of quasi continuous incoming particle flux.

10 Claims, 3 Drawing Sheets

(56) References Cited

U.S. PATENT DOCUMENTS

| | | | |
|---|---|---|---|
| 2006/0071170 A1* | 4/2006 | Broennimann | H01L 27/14661 250/370.09 |
| 2007/0152864 A1 | 7/2007 | Pease | |
| 2008/0001065 A1 | 1/2008 | Ackland | |
| 2010/0044552 A1 | 2/2010 | Chen | |
| 2011/0108735 A1 | 5/2011 | Ruetten et al. | |
| 2013/0256547 A1 | 10/2013 | Soh et al. | |
| 2013/0258151 A1 | 10/2013 | Ayers et al. | |
| 2014/0166861 A1 | 6/2014 | Schmitt et al. | |
| 2015/0103973 A1 | 4/2015 | Liu et al. | |

OTHER PUBLICATIONS

P.F.I. Scott, et al.; "A high dynamic range camera with a non-destructive readout complementary metal-oxide-semiconductor sensor; A HDR camera with a NDR complementary metal-oxide-semiconductor sensor"; Measurement Science and Technology, IOP Bristol; 2009; pp. 1-8; vol. 20, No. 10; IOP Publishing Ltd; UK; XP020164600; ISSN: 0957-0233;; GB.

* cited by examiner

METHOD FOR EXTENDING THE DYNAMIC RANGE OF A PIXEL DETECTOR SYSTEM USING AUTOMATIC GAIN SWITCHING

BACKGROUND OF THE INVENTION

Field of the Invention

The present invention relates to a method to extend the dynamic range of an automatic gain switching pixel detector system, i.e. a system where the input amplifier can automatically be switched to different gains, beyond the intrinsic amplifier dynamic range in case of a quasi-continuous incoming particle flux. The same method can also be used for pixel detector systems which have several gain stages in parallel for each pixel. In both cases the pixel detector can be monolithic (i.e. the sensor and amplifier share the same layer) or of a hybrid type where the sensor and amplifier parts are separate layers.

The invention enables a multifold (e.g. 10× up to several orders of magnitude) increase in dynamic range for a single image, and if implemented in a high frame rate system could allow the same orders of magnitude increase in photon flux with respect to the systems currently used at Synchrotron experimental stations.

Hybrid pixel detectors comprise an X-ray sensitive layer (i.e. a semiconductor sensor) and a readout chip, both divided into pixels. Each pixel in the sensor can be directly connected (bump bonding or flip chip bonding) to the corresponding pixel in the readout chip. The readout chip (ROC) contains an array of N×M independently working channels (pixels). In case of N (or M) equal to one (i.e. a 1d strip detector) the connection technology can also be wire bonding. In case of monolithic detectors the sensor part is directly implemented in the same layer as the ROC, i.e. no bump bonding connection is required.

Two main classes of readout chips are used in photon science: single photon counting ROC and charge integrating ROC. The performances in terms of photon rate capabilities have to be discussed separately for the two architectures.

For single photon counting, each channel has a charge sensitive preamplifier with tunable gain, a signal shaper, a comparator and a counter with pixel control and readout logic. A photon interacting with the sensor generates electron-hole pairs. This charge signal from the sensor is amplified and filtered by the low noise preamplifier and shaper in the corresponding pixel cell in the readout chip. The shaped signal is fed to a comparator with a global threshold voltage and a per-pixel trim DAC. An incoming signal exceeding this threshold will toggle the comparator state and the comparator pulse increments the digital counter by one. During the readout phase the pixel counter states are transferred to the chip periphery, where they are readout via dedicated logic.

Photon counting systems suffer from inefficiencies at high rates of incoming photons. These inefficiencies are predominantly caused by the overlap of the analogue signals of the preamplifier from temporally adjacent photons that are counted as a single event instead of independent events (pile-up). The size of the overlap window is a function of the temporal shaping of the preamplifier and the comparator threshold. State of the art SPC ROCs cannot exceed a few $10^6$ photons per second per pixel and at this flux level rate correction algorithms, which have a negative influence on the data quality, have to be used.

The count rate capabilities can be extended by a charge integrating system. In such a system the charge (generated by the photons) is integrated during the acquisition time, the signal at the output of the preamplifier (corresponding to the integrated charge) stored on a hold capacitor and then the analogue voltage is read out. In case of a dead time free system (i.e. a system where the frame rate matches the acquisition time), the maximum incoming flux is defined by the product of the saturation level of the integrating preamp for a pixel in number of photons and the frame rate in Hz.

With gain switching technology, pioneered in the X-ray field by Paul Scherrer Institut (PSI) and now used by several detector groups in the world, pixel readout circuits with saturation levels in excess of $10^4$ photons at 12 keV can be produced, while maintaining a single photon resolution capability for low flux measurements. For example, the PSI designed Jungfrau detector system will have a frame rate of 2.4 kHZ for a total photon rate capability of $2.4*10^7$ photons per second per pixel (75 um pitch) at 12 keV.

To improve on this number future systems will need to either have faster frame rates, with impact on data volumes and power consumption, or bigger saturation levels, which are limited by the size of the feedback capacitors that are feasible in the limited pixel area.

SUMMARY OF THE INVENTION

It is therefore the objective of the present invention to provide an X-ray detector which can work at high incoming photon rates and only minor or no adjustments made to the frame rate and the saturation levels (or feedback capacitor sizes) of the first amplifier stage.

This objective is achieved according to the present invention by a detector system, comprising:

a) a layer of photosensitive material;

b) an N×M array of photo-detector diodes arranged in said layer of photosensitive material; each of said photo-detector diodes having a bias potential interface and a diode output interface, said bias potential interface of each photo-detector diode being connected to a bias potential;

c) a N×M array of high gain, low noise readout unit cells, one readout unit cell for each photo-detector diode; and d) each readout unit cell comprising:

d1) an input interface connecting said diode output interface to a high-gain charge-to-voltage amplifying means;

d2) said high-gain charge-to-voltage amplifying means having a number of gains and being able to automatically switch between the gains, d3) said high-gain charge-to-voltage amplifying means having a number of gains implemented by an array of integration capacitors and being able to automatically switch between the gains, d4) a comparator and digital block for monitoring the charge of the integration capacitor and for switching the actual gain to another gain depending from the monitored charge of the integration capacitor.

Alternatively, this objective is achieved according to the invention by a detector system, comprising:

a) a layer of photosensitive material;

b) an N×M array of photo-detector diodes arranged in said layer of photosensitive material; each of said photo-detector diodes having a bias potential interface and a diode output interface, said bias potential interface of each photo-detector diode being connected to a bias potential ($V_{bias}$);

c) a N×M array of high gain, low noise readout unit cells, one readout unit cell for each photo-detector diode; and d) each readout unit cell comprising:
  d1) an input interface connecting said diode output interface to a high-gain charge-to-voltage amplifying means;
  d2) said high-gain charge-to-voltage amplifying means having a number of gains and being able to automatically switch between the gains,
  d3) said high-gain voltage amplifying means comprise one or several charge-to-voltage amplifier having fixed but different gains or having in addition several gain stages in parallel and a comparator and digital block for monitoring the charge of the integration capacitor.

The new pixel detector provides the possibility of in pixel intermediate evaluation of the automatic gain switching circuit state to increase the dynamic range of the detector in case of quasi continuous incoming particle flux (quasi continuous flux being defined as a flux changing only on time scales bigger than 1/(frame rate)). Under this condition, a pixel that receives a strong X-ray flux and which would be saturated, at the end of the integration time, will switch to the lowest gain earlier in time than a pixel that receives a lower flux.

A preferred embodiment of the present invention can be achieved when the gain switching logic block is enabled to continuously compare during the integration window the charge in the integration capacitor to a threshold and is further enabled to switch to another gain when a predefined threshold for the charge in the (or the sum of the) integration capacitor(s) is reached. Typically in this embodiment, the gain switching logic block may be enabled to switch the actual gain to a lower gain.

Another preferred embodiment covers a solution for the situation where the charge-to-voltage amplifying means is already operated at the lowest gain, i.e. due to a quasi-continuous photon stream. To achieve this preferred embodiment, the gain switching logic block is enabled to save at a predefined sample time T1 (with T1 smaller than the acquisition time T) the charge of the integration capacitor in a sample capacitor in case the charge-to-voltage amplifying means is, at the same point in time, already operated at the lowest gain. The predefined sample time T1 depends on the capacity of the storage capacitor and the frame rate.

A further preferred embodiment of the present invention can be achieved when the digital block is enabled to save at several predefined sample times the charge of the integration capacitor to a sample capacitor in case the high-gain charge-to-voltage amplifying means is already operated at the lowest gain.

Another preferred embodiment can be realized when the digital block (30) encodes the sampling of the signal at the predefined time T1 as BIT1 together with the gain bits of the automatic gain switching so that for three gains and the presence of the sampling at T1 (BIT1) only two gain bits are needed.

In order to avoid amplifier damage in case of a high input signal, the digital logic block may keep the preamplifier, depending on BIT_1, after T1 in reset; if BIT 1 has not been set the preamplifier may be kept in reset after time T until the next acquisition is performed. For a dead-time free system, this reset time can be very short.

As mentioned above, another embodiment of the present invention is achieved with an architecture which does not implement switchable gains but has several fixed gain stages operated in parallel and a comparator and digital block for monitoring status of one or more of these gain stages.

Another option can be achieved when the digital block is enabled to save at a predefined sample time the signal of the lowest gain stage to a sample capacitor in case the lowest gain stage would reach saturation at or before time T; in this case also BIT1 is set.

Another preferred embodiment of the present invention provides for the digital block being enabled to save at several predefined sample times the signal of the lowest gain stage to a sample capacitor in case the lowest gain stage would reach saturation at or before the acquisition time T.

In order to achieve a compact set-up for the readout unit cell, a further preferred embodiment of the present invention may provide a multiplexing means allowing to access the readout unit cell either on a per pixel basis or for several pixels in parallel to read out the charge of the integration capacitor to a data processing means transferring the data off the readout unit cell.

Preferred embodiments of the present invention are hereinafter described in more detail with respect to the attached drawings which depict in:

DESCRIPTION OF THE INVENTION

Figure 1:
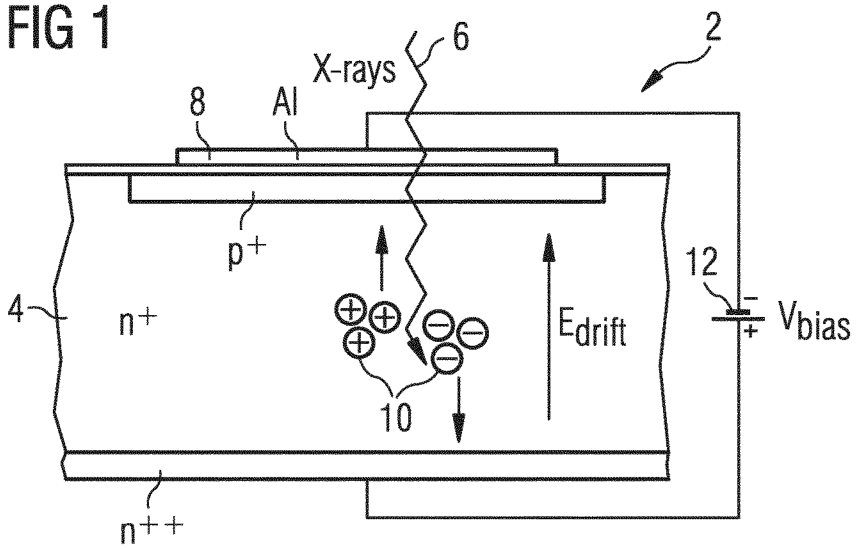
FIG. 1 a schematic view of the design of a photo-detector diode.

FIG. 1 illustrates schematically the architecture of a photo-detector diode (2) having a semiconductor trespassing section (4) with doping regions $p^+$, $n^-$, $n^{++}$ (referred to as semiconductor sensor). The most commonly used material is a silicon crystal but also germanium, gallium arsenide or cadmium (zinc) telluride can be used. In case of monolithic detector systems, the sensor is directly implemented in the same layer as the readout electronics (16).

An incident photon (6) having an energy in the range of few hundred eV to few hundred keV before entering the semiconductor sensor ($p^+$, $n^-$, $n^{++}$ trespassing section 4), passes through a possible cover layer (e.g. aluminum) (8) and causes according to its energy and to the energy needed to create an electron hole pair a respective number of electron hole pairs (10) after x-ray absorption. In the drawings, this number of electron hole pairs is exemplarily shown by three electron-hole pairs (10) being separated by the electrical field generated by a source of bias potential (12).

Figure 2:
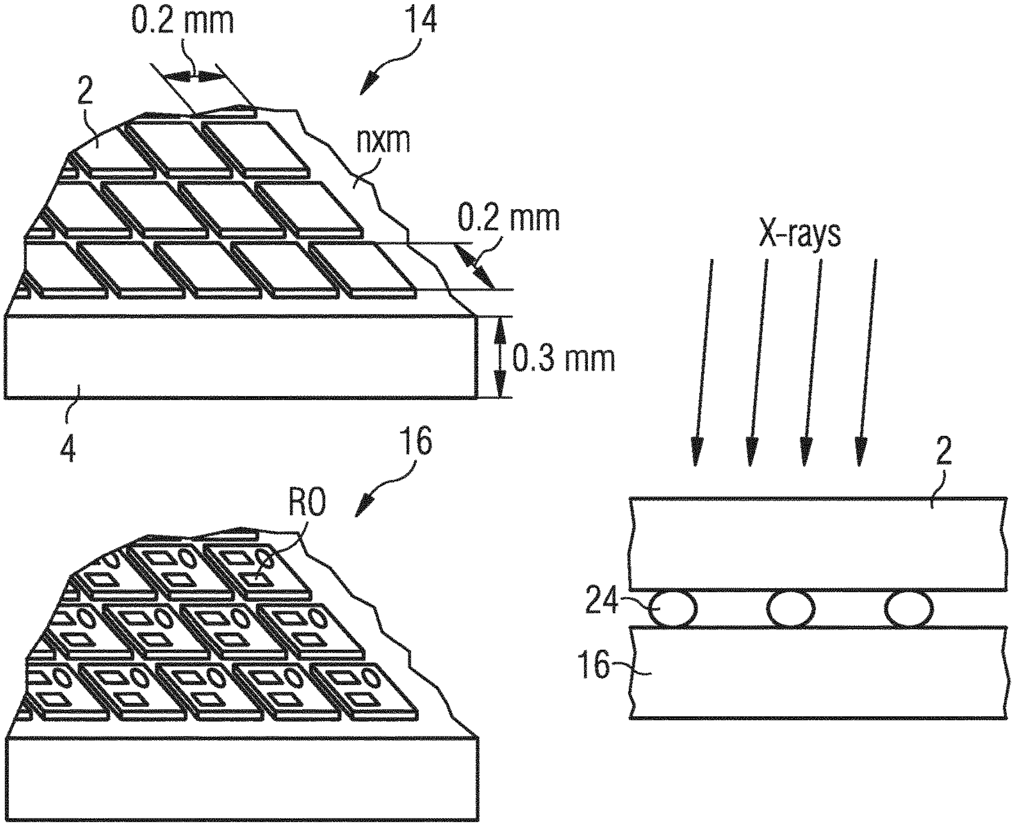
FIG. 2 a schematic view of a part of a detector module comprising an array of photo-detector diodes as one of them is shown in FIG. 1.

FIG. 2 shows a schematic view of a two-dimensional pixel detector (14) having a number of photo-detector diodes (2) arranged in an array of N rows and M columns. The photo detector diodes (2) have a length l and a width w of about 10-500 μm and a height of about 20 μm to 2 mm. Below the plane of these photo-detector diodes (2) a readout chip (16) having a corresponding number of readout unit cells RO is arranged for collecting the charge from the electron hole pairs (10) generated in the respective photo-detector diodes (2). The electrical conjunction between a diode output interface of the photo-detector diodes (2) and an input interface IN of the readout unit cell RO is achieved by bump bonding using for example indium or solder bumps (24). In case of an one-dimensional detector (N or M equals 1) the connection between the diode output interface and the RO cell input interface can also be done with wire bonding. In case of monolithic detectors the sensor diodes are implemented in the readout chip directly and no bump bonding is necessary.

Figure 3:
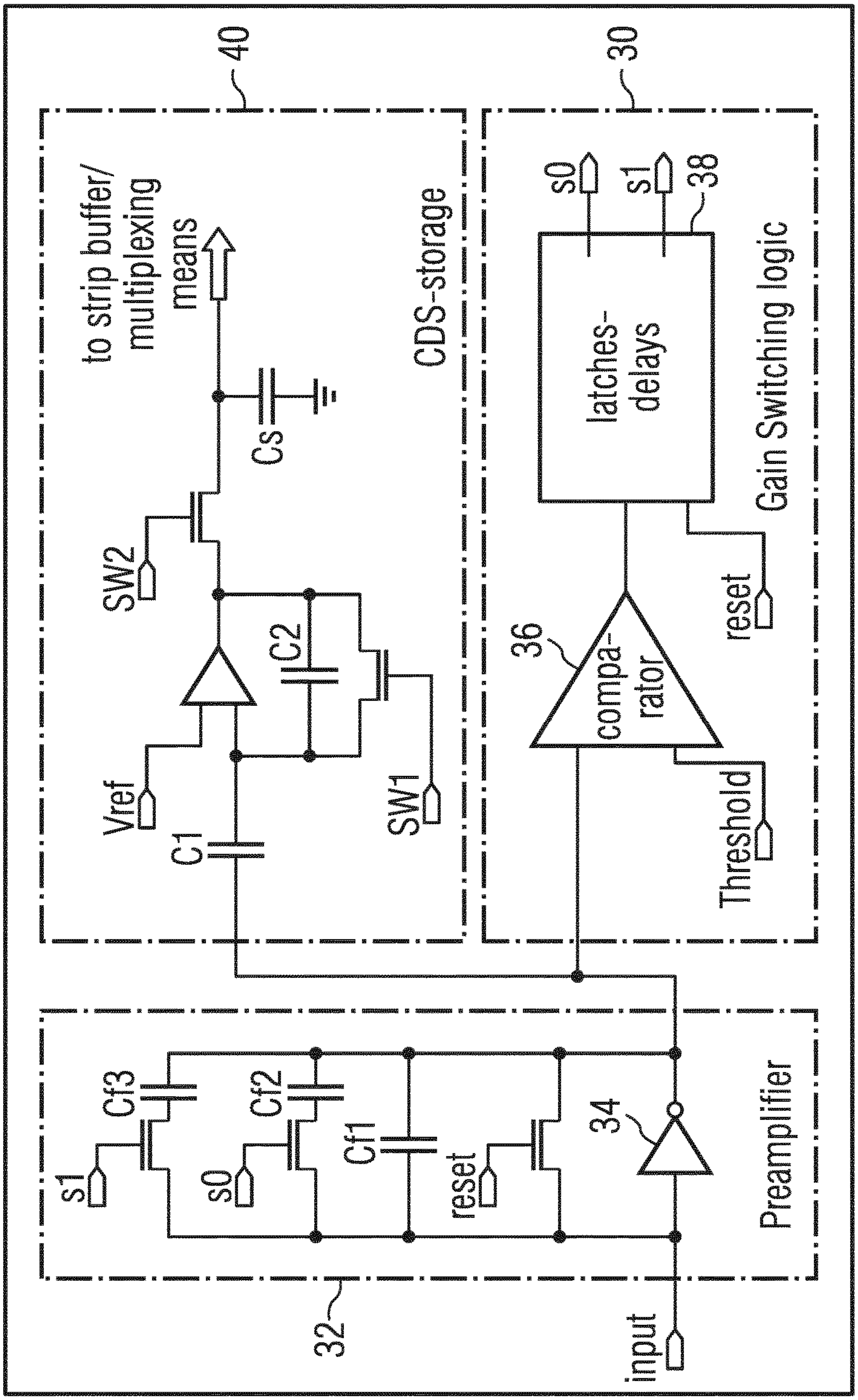
FIG. 3 a schematic view on the read out (RO) architecture of the detector module according to FIG. 2.

FIG. 3 shows a schematic view of the architecture of a readout unit cell RO (14), in particular of the circuitry of the gain switching circuit (30). The readout unit cell RO further comprises a front end block (32) which is based on a preamplifier (34) in charge integrating configuration. The preamplifier gain can be changed: a fixed small size feedback capacitor Cf1 is used for the high gain, while the insertion (in parallel to Cf1) of two capacitors Cf2 and Cf3, ~10 and ~100 times bigger than Cf1 respectively, lowers the gain to a medium or low value. While the gain setting can be fixed with an external signal, in the normal mode of operation the control of the gain is automatically handled by the front end circuit (30) itself. For this purpose, the output of the preamplifier is continuously monitored by a comparator (36). When the signal level crosses a predefined threshold, a gain switching logic (38) is triggered.

The threshold voltage is common for all the channels/pixels and is placed at the border of the output range of the preamplifier (34). The logic, based on delay stages and latches, controls the insertion of the feedback capacitors Cf2 and Cf3, according to the following rules:

- if the switching from high to the medium gain is not enough to bring the output back into the preamplifier output range, after a short time a second switching to low gain is performed;
- the second switching from medium to low should not be done in case of signal spikes due to the transient response after the first switching.

In the idle state the preamplifier (34) is kept in reset at the low gain mode, so that all the feedback capacitors Cf1 to Cf3 are emptied. A few nanoseconds before the beginning of the measurement the capacitors Cf2 to Cf3 are disconnected so that the gain is set to high. Then, the reset switch is opened and the input charge starts to be integrated. The amplifier switches automatically depending on the amount of input charge integrated on the feedback capacitance. The output voltage and the gain information (encoded in two digital bits) are sampled at the end of the integration time in a charge sampling and storage module (40). Together, they allow the determination of the incoming charge.

Figure 4:
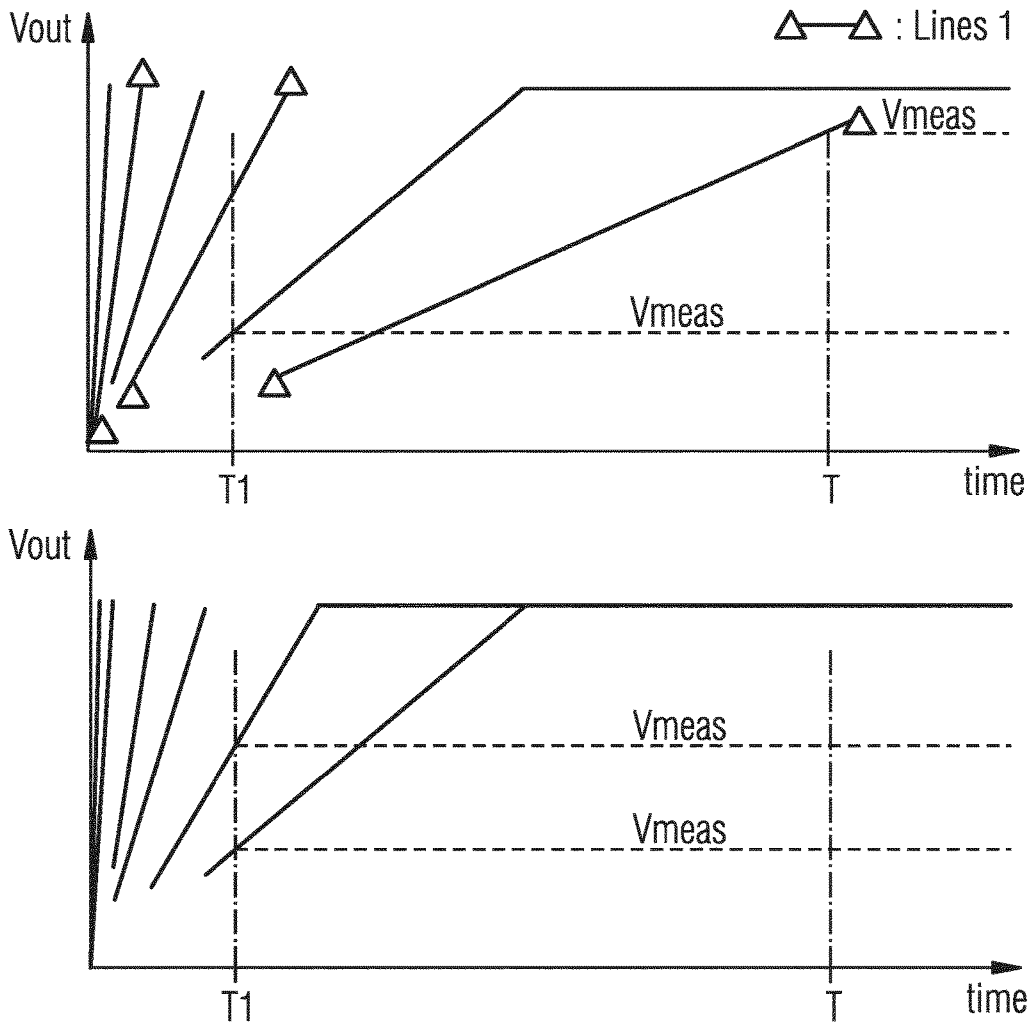
FIG. 4 a schematic view on the output response of the preamplifier for 4 pixels with 3 different input fluxes (two pixels, one in each plot, receive the same input flux).

In a further embodiment of the present invention, the integrated charge can be monitored in more detail. As shown in FIG. 4, for continuous incoming flux, a time T1 can be found for which all the pixels/readout channels that at this time T1 have not yet switched to the lowest gain will not saturate at the end of the integration time T. This time T1 depends on the gain ratios and on the range of the different gains, but for a given system is a constant fraction of the integration time T.

If—at this time T1—the status of the pixels is analyzed, the pixels can be divided in two categories: the ones which are in the lowest gain and the others. The former will saturate before the end of the integration time T and, by means of a simple digital logic present in the readout unit cell RO, it is decided to store on the sample capacitor the value of the integrated charge at time T1. This signal is still linear with the incoming flux and the total number of photons in the integration time can be reconstructed multiplying the measured value by the ratio T/T1 (under the assumption that the incident photon rate is constant over the sample time T, i.e. quasi continuous).

FIG. 4 illustrates the output response of the preamplifier (34) for four pixels with three different input fluxes (2 pixels have the same photon flux):

a) a flux that does not produce saturation (Lines 1, triangular symbol), and two higher flux cases where the pixel is in low gain already at T1 so that the internal pixel logic chooses to sample $V_{out}$ at time T1 and not at time T, where saturation will be certain.

For the implementation of the present invention the following features in the readout unit cells RO (pixel circuits) have to be present:

- An automatic gain switching preamplifier with e.g. three gains
- A global signal routed to the pixel-matrix defining the time T1;
- A digital logic block which evaluates the status of the gain switching circuit at time T1 and stores the result of this evaluation (BIT_1) in one or more latches or flip-flops;
- A digital logic block which, based on BIT_1, controls the store switch of the sample capacitor;
- A digital logic block which keeps the preamplifier in reset, depending on BIT_1, either after T1 or after T until the next acquisition is started. This is necessary to avoid amplifier damage in case of a high input signal;
- A way to readout BIT_1 together with the rest of the analogue and digital information from the pixel.

The concept can be applied to the gain switching logic (30) with any number of gains, and can be further extended increasing the number of times the gain evaluation is performed, adding a T2, T3, . . . , Tx and corresponding digital latches (BIT_2 . . . BIT_X), giving a theoretical increase flux capabilities of R^X where R is the ratio of the last two gains of the gain switching preamplifier (34). Typically this ratio R is 10 so that an increase of several orders of magnitude in the measurable photon flux can be achieved using several evaluation times Tx.

This concept can also be applied to the case where each pixel has several fixed gain stages in parallel. In this case, the pixel logic has to evaluate at the time T1 if either the second lowest gain stage is saturated or the lowest gain stage is above a certain threshold value (corresponding to a saturation of the low gain stage at the acquisition time T) and sample the lowest gain stage signal at the time T1 if this is the case. Also here the dynamic range is extended by the ratio of the lowest gain divided the second lowest and also here the concept of several times Tx can be applied.

The additional circuit (30) which is required to realize the invention, compared to state of the art detectors consumes a very small additional area (<5%) of a 75×75 $um^2$ pixel and a negligible electrical power while in operation. The functionality of the gain switching logic (30) has been tested for ASICs using a continuous visible light source as stimulus. The expected dynamic range extension has been demonstrated.

The generic concept presented here allows to extend the dynamic range of a system like the known Jungfrau detector of the applicant by a factor close to ten without any cost in terms of power consumption, data volume and data quality, and with only a negligible increase in circuit complexity. In the specific case of the Jungfrau detector this solution will allow to measure fluxes up to 2.4 E8 photons per second per pixel.

In case of a pixel detector without automatic gain switching but with several fixed gain stages in parallel per pixel the same concept can be applied extending the dynamic range of the lowest gain stage by several orders of magnitude.

The invention claimed is:

1. A detector system, comprising:

a) a layer of photosensitive material;

b) an N×M array of photo-detector diodes arranged in said layer of photosensitive material; each of said photo-detector diodes having a bias potential interface and a diode output interface, said bias potential interface of each said photo-detector diode being connected to a bias potential;

c) an N×M array of high gain, low noise readout unit cells, with one readout unit cell for each said photo-detector diode; and d) each readout unit cell having:

d1) an input interface connecting said diode output interface to a high-gain charge-to-voltage amplifier;

d2) said high-gain charge-to-voltage amplifier having a plurality of gains implemented by an array of integration capacitors and being configured to automatically switch between the gains; and d3) a comparator and digital block for monitoring a charge of said integration capacitors and for switching an actual gain to another gain depending on a monitored charge of said integration capacitors; and wherein said digital block is configured to encode the sampling of the signal at a predefined time T1 as BIT1 together with gain bits of the automatic gain switching so that for three gains and a presence of the sampling at T1 only two gain bits are needed.

2. The detector system according to claim 1, wherein said digital block is configured to compare the charge in said integration capacitor at any time during integration and to switch to another gain when a predefined threshold for the charge in the integration capacitor is reached.

3. The detector system according to claim 2, wherein said digital block is configured to switch the actual gain to a lower gain.

4. The detector system according to claim 1, wherein said digital block is configured to save at a predefined sample time the charge of said integration capacitor to a sample capacitor in case said high-gain charge-to-voltage amplifier is already operated at a lowest gain.

5. The detector system according to claim 1, wherein said digital block is configured to save at several predefined sample times the charge of said integration capacitor to a sample capacitor in case said high-gain charge-to-voltage amplifier is already operated at a lowest gain.

6. The detector system according to claim 1, wherein said digital logic block is configured to maintain a preamplifier, depending on BIT_1, after T1 in reset; if BIT 1 has not been set the preamplifier is maintained in reset after time T until a next acquisition is performed.

7. A detector system, comprising:

a) a layer of photosensitive material;

b) an N×M array of photo-detector diodes arranged in said layer of photosensitive material; each of said photo-detector diodes having a bias potential interface and a diode output interface, said bias potential interface of each photo-detector diode being connected to a bias potential;

c) an N×M array of high gain, low noise readout unit cells, with one readout unit cell for each said photo-detector diode; and d) each readout unit cell having:

d1) an input interface connecting said diode output interface to a high-gain charge-to-voltage amplifier;

d2) said high-gain charge-to-voltage amplifier having a plurality of gains and being configured to automatically switch between the gains, d3) said high-gain voltage amplifier including one or a plurality of charge-to-voltage amplifiers having fixed but different gains or having in addition a plurality of gain stages in parallel, and a comparator and digital block for monitoring a charge of an integration capacitor; and wherein said digital block is configured to save at several predefined sample times a signal of a lowest gain stage to a sample capacitor in case a lowest gain stage would reach saturation at or before an acquisition time T.

8. The detector system according to claim 7, wherein said digital block is configured to save at a predefined sample time a signal of a lowest gain stage to a sample capacitor in case the lowest gain stage would reach saturation at or before time T, in which case BIT1 is also set.

9. The detector system according to claim 7, wherein said digital logic block is configured to keep a preamplifier, depending on BIT_1, after T1 in reset; if BIT1 has not been set, the preamplifier is kept in reset after time T until a next acquisition is performed.

10. The detector system according to claim 7, which comprises a multiplexer configured to allow access to the readout cell unit either on a per pixel basis or for a plurality of pixels in parallel and to read out a charge of an integration capacitor transferring data of said readout unit cell to a data processor.

* * * * *